United States Patent [19]

Atkinson et al.

[11] Patent Number: 5,106,209
[45] Date of Patent: Apr. 21, 1992

[54] MULTI-PLANE LUBRICATED BEARING ASSEMBLY

[75] Inventors: Edward Atkinson, Morrow; Essam E. Salama, West Chester, both of Ohio

[73] Assignee: General Electric Company, Cincinnati, Ohio

[21] Appl. No.: 741,696

[22] Filed: Aug. 7, 1991

[51] Int. Cl.⁵ .................... F16C 33/66; F16C 33/60
[52] U.S. Cl. ..................... 384/475; 384/462; 384/506
[58] Field of Search ............... 384/462, 465, 466, 467, 384/474, 475, 499, 506

[56] References Cited

U.S. PATENT DOCUMENTS

| | | | |
|---|---|---|---|
| 2,280,659 | 4/1942 | Muller | 384/475 |
| 3,195,965 | 7/1965 | Van Dorn | 384/475 |
| 3,269,786 | 8/1966 | Diver et al. | 308/187 |
| 3,531,167 | 9/1970 | Edge et al. | 308/187 |
| 3,811,743 | 5/1974 | Wren | 384/475 |
| 4,334,720 | 6/1982 | Signer | 308/187 |
| 4,384,749 | 5/1983 | Schaefer | 308/187 |
| 4,463,994 | 8/1984 | Eliason et al. | 308/196 |
| 4,479,682 | 10/1984 | Oliver | 384/475 |
| 4,797,014 | 1/1989 | Nicolich | 384/490 |
| 4,858,427 | 8/1989 | Provenzano | 60/39.08 |
| 4,932,500 | 6/1990 | Smith et al. | 184/5.1 |

Primary Examiner—Thomas R. Hannon
Attorney, Agent, or Firm—Jerome C. Squillaro

[57] ABSTRACT

A bearing assembly includes a split inner race having first and second inner race halves joined together at a split line. A plurality of center feed passages are provided at the split line, and at least one radial pilot passage is provided in one of the inner race halves and axially spaced from the center feed passages. A bifurcated distribution manifold is disposed at the split line and includes a center distribution manifold disposed in flow communication with the center feed passages, and a pilot distribution manifold disposed in flow communication with solely the pilot passage. The bifurcated distribution manifold ensures the independent channeling of lubricating oil to both the center feed passages and the pilot passage under centrifugal force upon rotation of the inner race.

10 Claims, 4 Drawing Sheets

MULTI-PLANE LUBRICATED BEARING ASSEMBLY

TECHNICAL FIELD

The present invention relates generally to bearing assemblies, and, more specifically, to a split inner race bearing assembly having improved lubrication.

BACKGROUND ART

One conventional bearing assembly includes inner and outer races between which are positioned a plurality of circumferentially spaced bearings, or bearing elements such as ball bearings, which are circumferentially spaced apart by an annular cage. The outer race is fixedly joined to a stationary housing, and the inner race is fixedly mounted to a rotor shaft which is supported thereby.

For high rotational speed applications of the bearing assembly, for example at DN values on the order of about $1.5 \times 10^6$, the inner race is axially split for providing a radially extending center plane disposed generally in line with the bearing centers, with a plurality of circumferentially spaced and radially extending oil center feed passages disposed at the split line. The center feed passages effectively carry lubricating oil radially outwardly to the bearings under centrifugal force upon rotation of the inner race and shaft. In a high speed split inner race bearing assembly, the inner races are subjected to relatively high stress induced by rotation. In particular, the central zone over which the ball tracks is most sensitive to any additional stress risers caused by material discontinuities such as holes or slots which can decrease the effective life of the bearing assembly.

Furthermore, conventional split inner race bearing assemblies may also include secondary radial passages for lubricating adjacent components of the bearing assembly spaced axially from the split line. Since the lubricating oil channeled through both the center and secondary passages is typically provided from a common oil source, suitable means must be provided for ensuring desired splits of the oil between the center and secondary passages. For example, means must be provided to ensure that the supply oil is not primarily channeled radially upwardly through one of the center or secondary passages by centrifugal force before reaching the other of the passages. The prior art recognizes this particular problem and offers solutions thereto of varying complexity and effectiveness. In one prior art design, it is recognized that oil split between center and secondary passages is proportional to rotational speed of the shaft, as well as angular alignment between the two inner race halves. In other designs, a more constant oil split between the center and secondary passages is obtained irrespective of rotational speed but with increased complexity and undesirable stress increasing passages adjacent to the split line which are undesirable for high speed operation.

OBJECTS OF THE INVENTION

Accordingly, one object of the present invention is to provide a new and improved split race bearing assembly having improved lubrication.

Another object of the present invention is to provide a split race bearing assembly having multi-plane lubrication with predetermined oil splits therebetween.

Another object of the present invention is to provide a split race bearing assembly effective for operation at high speed.

DISCLOSURE OF INVENTION

A bearing assembly includes a split inner race having first and second inner race halves joined together at a split line. A plurality of center feed passages are provided at the split line, and at least one radial pilot passage is provided in one of the inner race halves and axially spaced from the center feed passages. A bifurcated distribution manifold is disposed at the split line and includes a center distribution manifold disposed in flow communication with the center feed passages, and a pilot distribution manifold disposed in flow communication with solely the pilot passage. The bifurcated distribution manifold ensures the independent channeling of lubricating oil to both the center feed passages and the pilot passage under centrifugal force upon rotation of the inner race.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
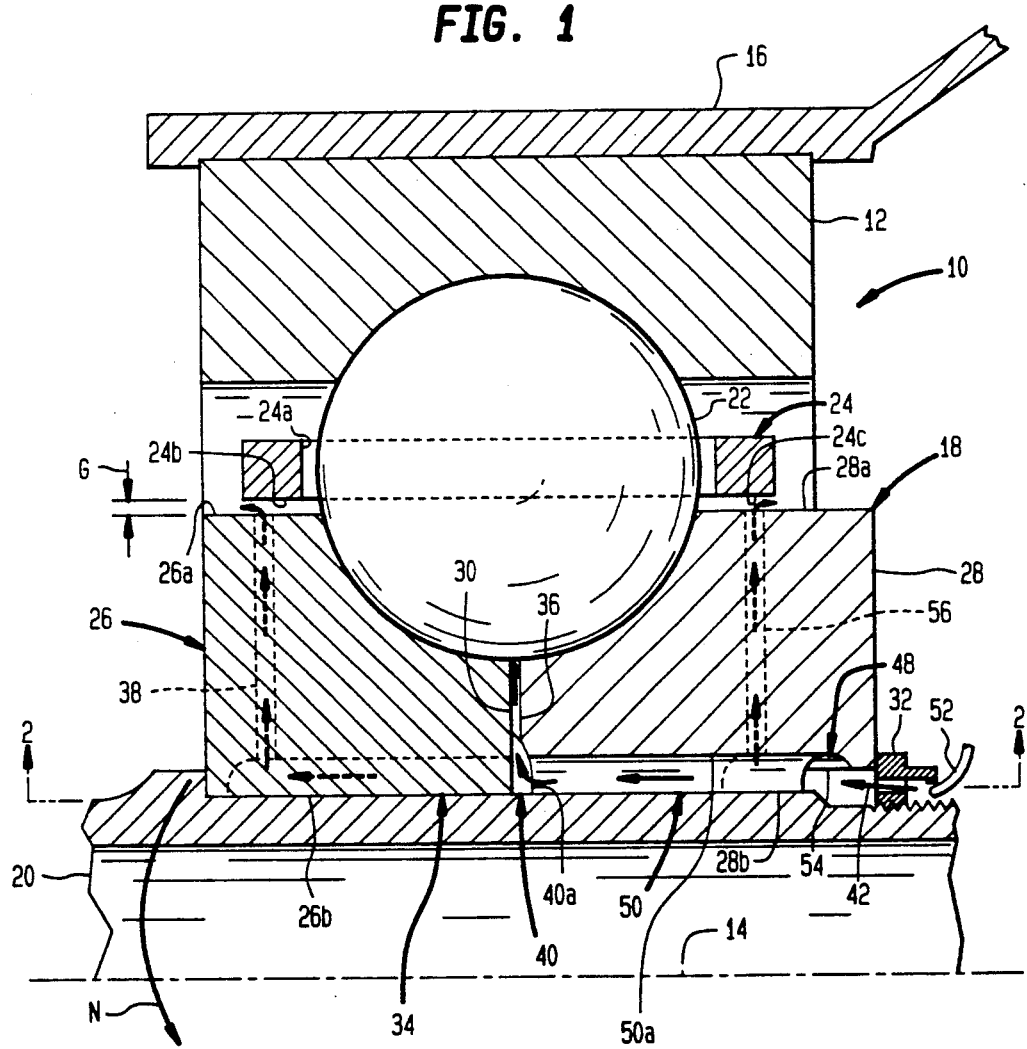
FIG. 1 is a longitudinal, partly sectional view of an upper half of a bearing assembly in accordance with one embodiment of the present invention taken along the plane shown generally in FIG. 2 at line 1—1.

Illustrated in FIG. 1 is an exemplary annular bearing assembly 10 in accordance with one embodiment of the present invention. The assembly 10 includes a conventional annular outer race 12 disposed coaxially about a longitudinal or axial centerline axis 14, which is shown conventionally fixedly mounted in a stationary annular housing 16 of a gas turbine engine for example. The assembly 10 further includes a rotatable, annular split inner race 18 conventionally fixedly mounted to a rotor shaft 20 which is rotatable at a speed N. A plurality of circumferentially spaced conventional bearings 22, such as ball bearings for example, are disposed between the outer and inner races 12 and 18. A conventional annular cage 24 having a plurality of circumferentially spaced, radial apertures 24a surrounds respective bearings 22 and is conventionally loosely joined to the bearings 22 for circumferentially separating the bearings 22. The cage 24 includes conventional first and second axially opposite pilot surfaces 24b and 24c spaced radially outwardly from the inner race 18 to define a nominal clearance gap G therebetween.

The split inner race 18 includes an annular first inner race half 26 and an annular second inner race half 28 conventionally joined together at a radially extending, axial split line or surface 30. For example, the second inner race half 28 is clamped against the first inner race half 26 at the split line 30 by a conventional nut 32 threadingly mounted to the shaft 20 for securing the inner race 18 against a conventional shoulder formed in the shaft 20.

Figure 2:
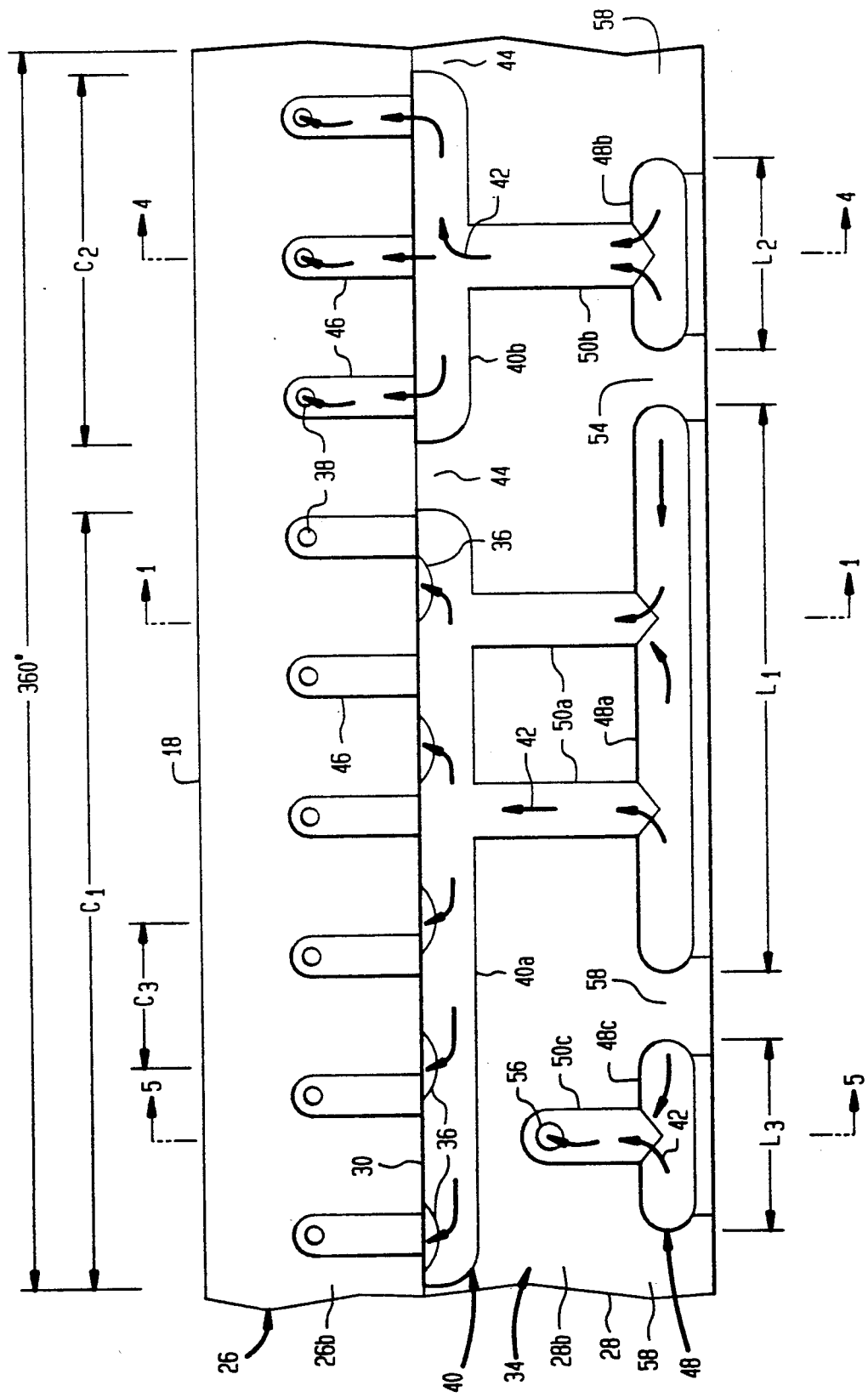
FIG. 2 is a radially outwardly facing view of the inner circumference of the inner race of the bearing assembly illustrated in FIG. 1 taken along the circumference indicated by line 2—2.

Referring also to FIG. 2 which is a view looking radially outwardly at an inner circumferential surface 34 of the inner race 18, a plurality of circumferentially spaced, radially extending center feed, or primary, oil passages 36 are disposed at the split line 30. Note that FIG. 2 illustrates the entire 360° C. extent of the inner circumference 34 spread out flat for clarity of presentation. The primary passages 36 are preferably in the form of arcuate grooves extending radially outwardly or vertically from the centerline 14 and are formed in the radial split line surface of the second inner race half 28. Since the region including the split line 30 is subject to high stress at high rotational speeds N resulting for example in operation of the bearing assembly 10 at values in excess of about $1.5 \times 10^6$ DN and typically up to about $2.3 \times 10^6$ DN, the arcuate grooved primary passages 36 result in minimal stress risers for ensuring an acceptable life of the bearing assembly 10.

The first inner race half 26 includes at least one, and in this exemplary embodiment a plurality of circumferentially spaced, radially extending first pilot, or secondary, oil passages 38, nine for example, which are spaced axially from the center feed passages 36. More specifically, the first inner race half 26 includes a first radially outer perimeter 26a spaced radially inwardly from the cage first pilot surface 24b to define the clearance gap G, and a first radially inner perimeter 26b which is mounted to the rotor shaft 20 and forms part of the inner circumferential surface 34. The first pilot passages 38 are disposed radially under the first pilot surface 24b for feeding oil thereto.

In accordance with one embodiment of the present invention, a circumferentially extending and circumferentially bifurcated oil distribution manifold 40 is disposed at the split line 30 and includes a center distribution manifold 40a disposed in flow communication with the center feed passages 36 for channeling oil 42 therethrough under centrifugal force upon rotation of the inner race 18 with the shaft 20. The bifurcated distribution manifold 40 also includes a pilot distribution manifold 40b (see FIG. 2) which is disposed in flow communication with solely at least one, and in this embodiment three, of the pilot passages 38 for channeling the oil 42 therethrough under centrifugal force upon rotation of the inner race 18. The center and pilot distribution manifolds 40a and 40b are sealed from each other for preventing oil flow therebetween.

More specifically, as shown in FIGS. 1 and 2, the center and pilot distribution manifolds 40a, 40b may be simply formed by providing an arcuate chamfer in the split line surface of the second inner race half 28 at the inner circumference 34. The center distribution manifold 40a extends circumferentially along the second inner race 28 for an angular distance C, which may be about 200° for example, and the pilot distribution manifold 40b may similarly extend for an angular distance $C_2$ of about 120° for example, with the two manifolds 40a and 40b being circumferentially separated from each other by two separating lands 44 which are part of the inner circumference 34 and sealingly contact the shaft 20 for preventing flow of the oil 42 between the center and pilot distribution manifolds 40a and 40b.

The radial first pilot passages 38 are joined to the pilot distribution manifold 40b by respective axially extending pilot slots 46 which are preferably arcuate shaped grooves formed in the first inner perimeter 26b which extend from the first pilot passages 38 to the split line 30. In a preferred embodiment of the present invention, the first pilot passages 38 are equiangularly spaced apart from each other at an angular distance $C_3$, about 40° for example, for the full circumferential extent of the first inner race half 26, with the angular spacing $C_3$ being less than the angular spacing $C_2$ of the pilot distribution manifold 40b so that at least one of the pilot slots 46, and corresponding first pilot passage 38, is disposed in flow communication with the pilot distribution manifold 40b irrespective of the angular alignment of the first and second inner race halves 26 and 28. In this way, the first and second inner race halves 26 and 28 may be assembled with any angular alignment therebetween and at least one, and in the exemplary embodiment three, of the first pilot passages 38 will be disposed in flow communication with the pilot distribution manifold 40b for receiving oil therefrom. The remaining pilot passages 38 and respective pilot slots 46, will therefore, not be disposed in flow communication with the pilot distribution manifold 40b and will not receive oil therefrom. However, the oil channeled through the three first pilot passages 38 may be sized for flow into the clearance gap G for adequately lubricating the first pilot surface 24b.

As shown in FIG. 1, the second inner race half 28 further includes a second outer perimeter 28a spaced radially inwardly from the cage second pilot surface 24c for similarly defining the clearance gap G, and a second inner perimeter 28b mounted to the rotor shaft 20 and which forms a portion of the inner circumferential surface 34 of the inner race 18. In accordance with another feature of the present invention, an arcuate, circumferentially extending collector manifold 48 is formed in the second inner perimeter 28b, in the preferred form of a semicircular groove therein, and is spaced axially from the bifurcated distribution manifold 40 and in flow communication therewith. For example, a plurality of axially extending and circumferentially spaced apart supply grooves 50 are formed in the second inner perimeter 28b and extend in flow communication between the distribution and collector manifolds 40 and 48, respectively.

In a preferred embodiment of the invention, the collector manifold 48 is circumferentially bifurcated, as shown in FIG. 2, and includes a center collector manifold 48a and a first pilot collector manifold 48b, and the supply grooves 50 include at least one, with two being shown, center supply groove 50a disposed in flow communication between the center distribution and collector manifolds 40a and 48a, and at least one first pilot supply groove 50b disposed in flow communication between the pilot distribution and collector manifolds 40b and 48b.

Figure 3:
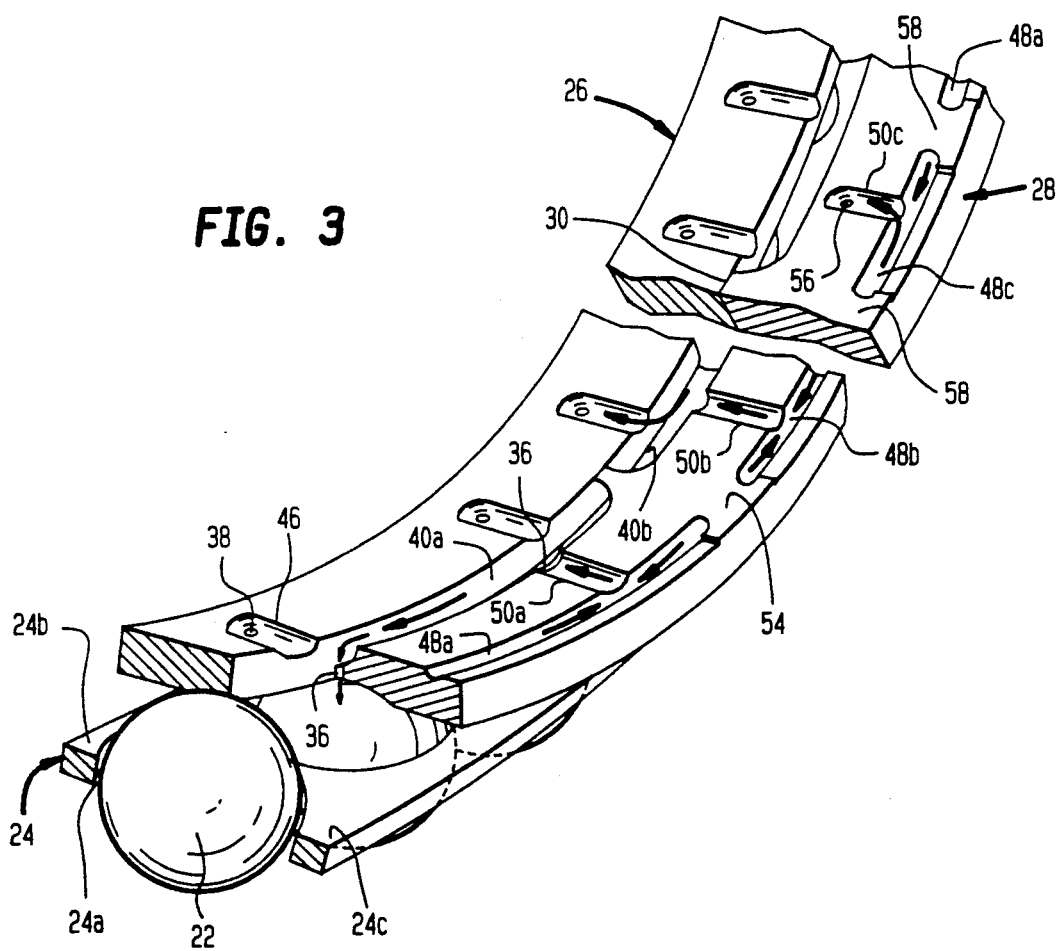
FIG. 3 is a perspective, partly sectional view of a portion of the bearing assembly illustrated in FIG. 1.
Figure 4:
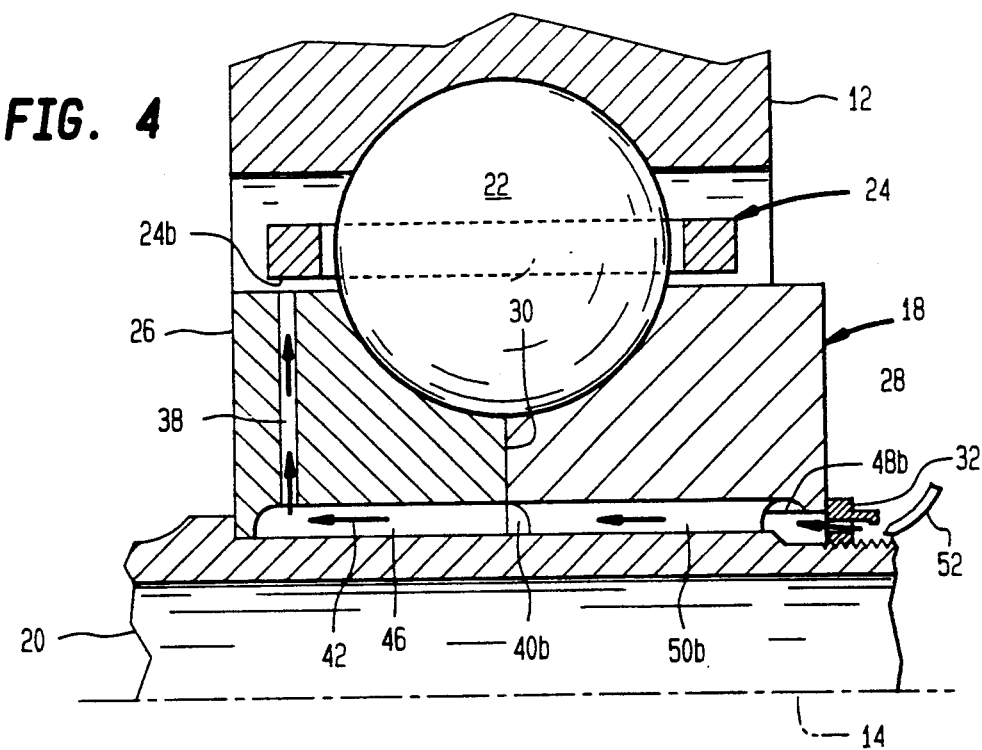
FIG. 4 is a longitudinal, partly sectional view of the bearing assembly illustrated in FIG. 2 taken along plane 4—4.

As shown in FIGS. 2-4, the oil 42 is channeled from the first pilot collector manifold 48b in the second inner race half 28, through the pilot supply groove 50b to the pilot distribution manifold 40b wherein it is then channeled over the split line 30 in respective branches to the pilot slots 46 and in turn to the respective first pilot passages 38 in the first inner race half 26. As shown in FIG. 1 for example, the oil 42 is conventionally provided to the collector manifold 48 through the conventional nut 32 which includes axial passages and a collector lip which receive the oil 42 from a conventional oil jet 52. The oil 42 is injected by the jet 52 through the collector nut 32 and upwardly into the collector manifold 48 wherein it is contained by centrifugal force which also causes the oil 42 to flow through the supply groove 50b, first pilot distribution manifold 40b, the pilot slots 46 and upwardly through the first pilot passages 38 to lubricate the first pilot surface 24b.

Similarly, and as shown in FIGS. 1-3, the oil 42 received in the center collector manifold 48a from the jet 52 is channeled under centrifugal force through the center supply grooves 50a to the center distribution manifold 40a at the split line 30 and then is branched through the respective center feed passages 36 upwardly through the inner race 18 by centrifugal force for lubricating the bearings 22. Although in the preferred embodiment some of the pilot slots 46 and first pilot passages 38 are disposed in flow communication with the center distribution manifold 40a (for eliminating the need to angularly align the two inner race halves 26 and 28 as described above), the oil 42 will not flow at all, or with any effective amount, therethrough since the path of least resistance for the oil 42 is radially upwardly through the center feed passages 36 at the split line 30 to lubricate the bearings 22. Accordingly, this is one reason why independent and distinct oil supply paths are provided from the pilot collector manifold 48b to the first pilot passages 38, and from the center collector manifold 48a to the center feed passages 36.

These separate oil channeling paths therefore allow for providing a predetermined split of the oil 42 from the collector manifold 48 to the center feed passages 36 and the first pilot passages 38. More specifically, the center collector manifold 48a extends circumferentially for an angular distance $L_1$, and the first pilot collector manifold 48b extends circumferentially for an angular distance $L_2$, with the two collector manifolds 48a, 48b being separated from each by a second separating land 54 which prevents oil communication between the two collector manifolds 48a and 48b. As the oil 42 is injected into the rotating collector manifold 48 as illustrated in FIG. 1, portions thereof will collect in the respective center and first pilot collector manifolds 48a and 48b. The amount of collected oil 42 depends upon the angular extent $L_1$ and $L_2$ of the center and first pilot collector manifolds 48a and 48b which determines the flow split of the oil 42 to the center feed passages 36 and the first pilot passages 38. In the exemplary illustrated, the center collector manifold 48a is larger in circumferential extent as compared to the first pilot collector manifold 48b to ensure that a majority of the oil 42 flows through the center feed passages 36. Accordingly, the angular extent $L_1$ is greater than the angular extent $L_2$, with $L_1$ being about 120° for example, and $L_2$ being about 40° for example.

Figure 5:
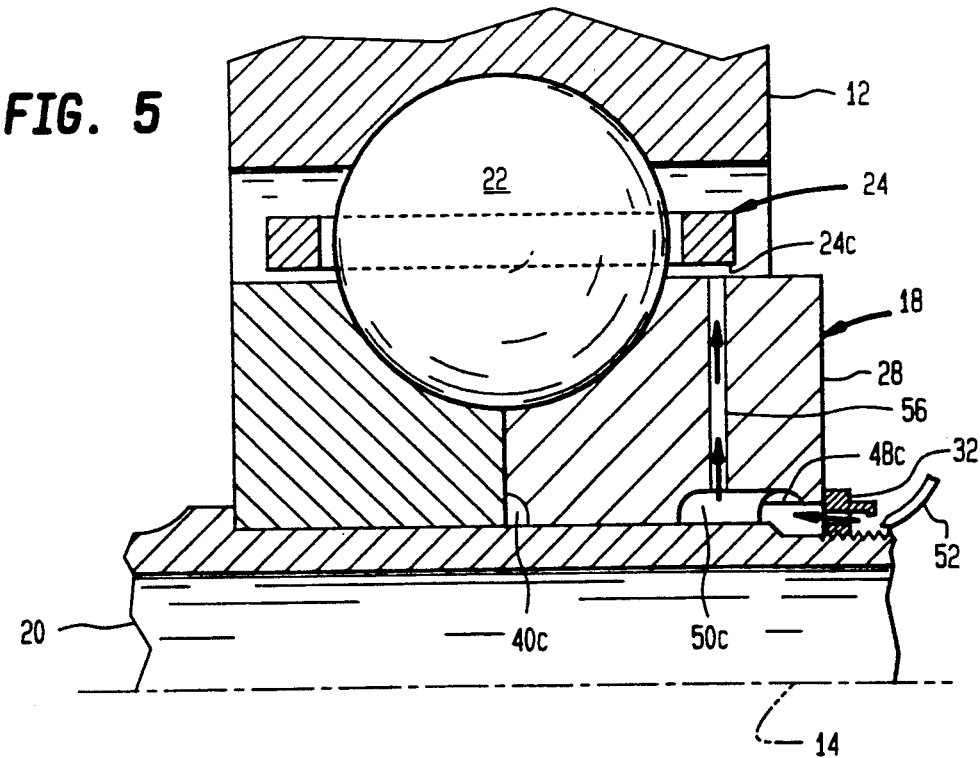
FIG. 5 is a longitudinal, partly sectional view of the bearing assembly illustrated in FIG. 2 taken along plane 5—5.

Since the first pilot surface 24b illustrated in FIG. 1 is lubricated by the first pilot passages 38, it is also desirable to lubricate the second pilot surface 24c by providing at least one radially extending second pilot passage 56 disposed radially under the second pilot surface 24c for feeding a portion of the oil 42 thereto, with the second pilot passage 56 being disposed in the second inner race half 28. In this embodiment as shown in FIGS. 2, 3, and 5, the bifurcated collector manifold 48 further includes a circumferentially extending second pilot collector manifold 48c which is circumferentially aligned with the center collector manifold 48a and the first pilot collector manifold 48b and separated therefrom by a pair of third separating lands 58. The second pilot collector manifold 48c is disposed in flow communication solely with the second pilot passage 56 by a second pilot supply groove 50c extending therebetween for channeling oil therethrough. A portion of the oil 42 is collected in the second pilot collector manifold 48c from the jet 52 and is channeled through the second pilot supply groove 50 and radially upwardly through the second pilot passage 56 by centrifugal force upon rotation of the second inner race half 28 and the shaft 20 for lubricating the second pilot surface 24c.

The second pilot collector manifold 48c similarly has a circumferential angular extent $L_3$ which is less than $L_1$ and generally equal to $L_2$ for providing a predetermined split of the oil 42 to the first and second pilot passages 38 and 56 and the center feed passages 36, with the majority of the oil 42 being channeled to the center feed passages 36, and substantially equal but lesser amounts being channeled through the first and second pilot passages 38 and 56 for lubricating the first and second pilot surfaces 24b and 24c.

Accordingly, the bearing assembly 10 including the split inner race 18 provides three separate and independent oil feeds from the center and first and second pilot collector manifolds 48a, 48b, and 48c to the respective center feed passages 36 and the first and second pilot passages 38 and 56 at three axially spaced apart planes including the first and second pilot passages 38 and 56 and the center feed passages 36. Because there is no flow connection between the three planes of oil feeds from the collector manifold 48 to the three oil discharge planes, there is no probability of oil intended for the pilot surfaces 24b and 24c being lost in the central feed passages 36, thereby ensuring full and effective cooling and lubrication at all three planes in the bearing assembly 10. Furthermore, oil for the farthermost, first pilot passages 38 can be fed across the split line 30 from the first pilot collector manifold 48b without being drained by centrifugal force into the center feed passages 36 at the split line 30. Yet further, the first and second inner race halves 26 and 28 do not have to be angularly aligned relative to each other to ensure flow communication of the oil to the first pilot passages 38 across the split line 30. This eliminates the need for conventional sleeves and angular alignment structures found in the art for angularly aligning split inner race halves.

As described above, three separate oil channeling systems including the respective center, first and second pilot collector manifolds 48a, 48b, and 48c disposed in flow communication with the center feed passages 36, and the first and second pilot passages 38 and 56 are disclosed. The three part collector manifold 48 is effective for catching oil from the jet 52 and providing a predetermined split thereof into the respective collector manifolds, i.e. 48a, 48b, and 48c. The three systems are circumferentially spread apart over the entire 360° extent of the inner circumference 34, but, in alternate embodiments of the invention, multiples of each of the three oil channeling paths could be provided. For example, two each of the oil distribution manifolds 40a and 40b could be provided in flow communication with a respective two each of the oil collector manifolds 48a and 48b, and two of the second pilot collector manifolds 48c could also be provided, all with respective ones of the first and second pilot passages 38, 56, and center feed passages 36 being provided. Furthermore, various, predetermined splits of the oil 42 may be provided by circumferentially sizing the angular extent of the respective collector manifolds 48a, 48b, and 48c in addition to the preferred sizing of the respective first and second pilot passages 38 and 56 and the center feed passages 36.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A bearing assembly comprising a rotatable split inner race mountable to a rotor shaft including:
    a first inner race half including at least one radially extending oil pilot passage;
    a second inner race half joined to said first inner race half at a split line;
    a plurality of circumferentially spaced, radially extending oil center feed passages spaced axially from said pilot passage, and disposed at said split line; and
    a circumferentially extending and bifurcated oil distribution manifold disposed at said split line and including a center distribution manifold disposed in flow communication with said center feed passages for channeling oil therethrough under centrifugal force upon rotation of said inner race, and a pilot distribution manifold disposed in flow communication with solely said pilot passage for channeling oil therethrough under centrifugal force upon rotation of said inner race, said center and pilot distribution manifolds being sealed from each other for preventing oil flow therebetween.

2. A bearing assembly according to claim 1 further including an arcuate collector manifold for receiving oil, and spaced axially from said bifurcated distribution manifold and disposed in flow communication therewith.

3. A bearing assembly according to claim 2 further including a plurality of axially extending and circumferentially spaced supply grooves extending in flow communication between said distribution and collector manifolds.

4. A bearing assembly according to claim 3 wherein said collector manifold is circumferentially bifurcated and includes a center collector manifold and a pilot collector manifold, and said supply grooves include a center supply groove disposed in flow communication between said center distribution and collector manifolds, and a pilot groove disposed in flow communication between said pilot distribution and collector manifolds.

5. A bearing assembly according to claim 4 wherein said bifurcated distribution manifold is disposed in said second inner race half, and further including an axially extending pilot slot disposed in flow communication between said pilot passage and said pilot distribution manifold.

6. A bearing assembly according to claim 5 further including:
    an outer race mountable in a stationary housing;
    a plurality of circumferentially spaced bearings disposed between said outer and inner races;
    a cage loosely joined to said bearings for circumferentially separating said bearings, and having first and second axially opposite pilot surfaces;
    said first inner race half further including a first outer perimeter spaced radially from said cage first pilot surface, a first inner perimeter mountable to said rotor shaft, and said pilot passage is a first pilot passage disposed radially under said first pilot surface for feeding oil thereto; and
    said pilot collector manifold is a first pilot collector manifold effective for receiving oil and channeling said oil through said pilot groove, said pilot distribution manifold, and said pilot slot to said first pilot passage.

7. A bearing assembly according to claim 6 wherein said second inner race half further includes:
    a second outer perimeter spaced radially from said cage second pilot surface;
    a second inner perimeter mountable to said rotor shaft;
    at least one radially extending second pilot passage disposed under said second pilot surface for feeding oil thereto; and
    said bifurcated collector manifold further includes a second pilot collector manifold disposed in flow communication solely with said second pilot passage for channeling oil therethrough.

8. A bearing assembly according to claim 7 wherein said first and second pilot and center collector manifolds are predetermined sized for providing a predetermined split of said oil to said first and second pilot passages and said center feed passages, respectively.

9. A bearing assembly according to claim 8 further including a plurality of said center supply grooves disposed in flow communication between said center distribution and collector manifolds.

10. A bearing assembly according to claim 6 further including a plurality of circumferentially spaced ones of said first pilot passages and a respective plurality of said pilot slots, at least one of said pilot slots being disposed in flow communication between said pilot distribution manifold and a respective one of said first pilot passages irrespective of angular alignment of said first and second inner race halves.

* * * * *